UNITED STATES PATENT OFFICE.

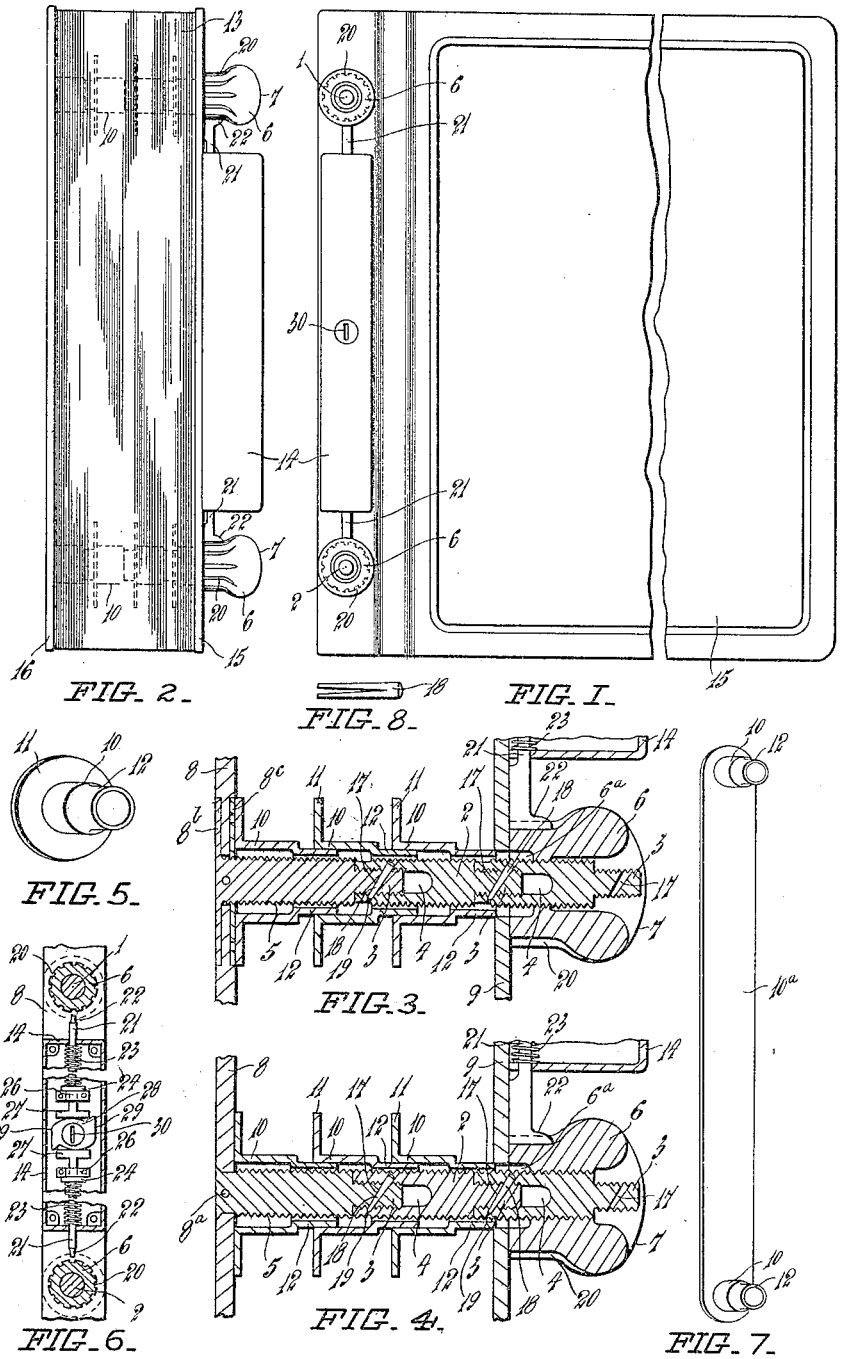

HAROLD HECTOR HENRY AHEARN, OF WELLINGTON, NEW ZEALAND.

LOOSE-LEAF BOOK AND THE LIKE.

1,131,648. Specification of Letters Patent. Patented Mar. 16, 1915.

Application filed April 22, 1914. Serial No. 833,667.

*To all whom it may concern:*

Be it known that I, HAROLD HECTOR HENRY AHEARN, a citizen of the Dominion of New Zealand, and residing at 110 Wakefield street, Wellington, in the Provincial District of Wellington, in the Dominion of New Zealand, warehouseman, have invented certain new and useful Improvements in Loose-Leaf Books and the like, of which the following is a specification.

The invention relates to loose leaf books such as ledgers, binders and the like, and provides improvements in binding apparatus used in connection therewith.

According to my invention binding pillars are employed, each composed of a plurality of sections, connected together by reduced extensions by screwing and so shaped that any number of sections may be added or removed without interfering with the adjustment of a nut which runs on a screw thread for clamping the leaves.

A plurality of thimbles or sleeves fitting one into the other slide upon each of the pillars, each thimble being adapted to receive a number of the loose leaves which are perforated to pass upon the thimbles.

I will now describe my invention in detail by aid of the drawing wherein:—

Figure 1, is a plan, and Fig. 2, an end elevation of the binder. Figs. 3 and 4, enlarged sectional elevations of two forms of pillars and thimbles thereon, Fig. 5, a perspective view of a thimble, Fig. 6, a plan of a lock partly in section, Fig. 7, a perspective view of two thimbles and a bar, and Fig. 8, is a side view of a split pin.

The binding pillars 1 and 2, are each composed of a number of removable sections, each having a screw threaded extension 3, which screws into a screwed hole 4, in the next section. The sections join together neatly, and a screw thread 5, extends continuously from one end of the pillar to the other, as shown in Fig. 4, so that a clamping nut 6 having a rounded top 7, may pass down the thread from end to end of the pillar, no matter how many sections may be added or removed. It is necessary to use the sections in the same order in which they were arranged when the thread was cut, otherwise the nut would not run from one section to the other, and for this purpose the sections may be numbered. The nut 6 has a recess $6^a$ to allow the reduced portion 12 of the uppermost thimble 10 to enter when the nut is screwed up.

In Fig. 3 a nut is shown with three threads only and a little more than three threads are removed from the lower end of each section. When the nut is screwed upon a pillar the threads of the nut are free of one section before they engage the thread upon the next section, so that with this construction the sections can be used in any order and not necessarily in the order they had when being screw threaded.

The end section of each pillar is permanently connected to a binder bar 8 by riveting and by a pin $8^a$ as shown in Fig. 4, and a clamping bar 9, has holes which are spaced apart to fit upon both pillars.

In Fig. 3 the pillar is shown with a flange $8^b$ sunk into the plate 8 and a nut $8^c$, which lies in a recess in the other side of the plate 8.

The thimbles 10 adapted to fit upon the pillars have each a flange 11, and a reduced portion 12, which slides telescopically into the next section. The thimbles may be separate as shown in Fig. 5, or they may be integral with a plate $10^a$, as shown in Fig. 7, in which case the thimbles have the same distance apart as the pillars.

The loose leaves 13, which have holes for the purpose fit upon the thimbles and when the nuts 6 are screwed down, are clamped between the several flanges.

The independent thimbles and the sections of the pillars, enable any section of leaves of the book to be removed without disarranging the others, and also enable the binder to be extended, or reduced, to accommodate any number of leaves.

A casing or block 14 upon the clamping bar is arranged to extend slightly above the pillars, when the nuts are screwed down, to provide a shield which prevents the ends of the pillars and the nuts 6 from coming into contact with and marking a desk or table.

The bars 8 and 9, are connected to the front and the back book covers 15 and 16 respectively in the ordinary way.

To prevent the pillars from unscrewing, except at the particular sections desired, a hole 17 is drilled diagonally through the juncture of the pillars and a pin 18, placed therein. The slope of the pins is the same in both pillars to prevent any tendency of the pins to fall out. The pin may be pushed out by passing a fine wire through a fine hole 19, at the bottom of the pin hole. The pin may be split as shown in Fig. 8 and be sprung into the hole for the purpose of obtaining a strong hold.

Means may be employed for locking the clamping nuts upon the pillars so as to prevent unauthorized withdrawal of the leaves. Fig. 6 shows a simple form of lock, for this purpose which is mounted in the casing 14. The nuts 6 are made with grooves or notches 20 around their peripheries and bolts 21 have feet 22 adapted to enter the said grooves. Springs 23 acting against shoulders 24 and the casing 14 of the lock normally withdraw the feet 22 from the grooves 20. The bolts are guided by the ends of the casing and by guides 26, and at their inner ends have crossheads 27 adapted to be operated by a cam 28, which has flat sides 29 adapted to rest against the crossheads. A slot 30 is adapted to receive an ordinary flat key not shown on the drawing, and wards of ordinary construction prevent the lock from being operated fraudulently. The cam 8 is turned by its key to force the bolts 1 into grooves 0, thereby preventing the nuts 6 from being unscrewed.

What I do claim and desire to secure by Letters Patent of the United States is:—

1. A loose leaf binder of the kind described, comprising a binder bar, a back to which the binder bar is attached, a clamping bar, a front to which the clamping bar is attached, screw threaded pillars made in sections and secured to the binder bar and passing through holes in the clamping bar, and nuts upon the pillars, substantially as set forth.

2. In a loose leaf binder of the kind described, a binder pillar made in sections which are externally screw threaded, substantially as set forth.

3. In a loose leaf binder of the kind described, a binder pillar made in sections and screw threaded outside, a portion of the thread being removed from the bottom of each section, a nut having a number of threads slightly less than the number of threads removed from each section, substantially as set forth.

4. In a loose leaf binder of the kind described, a binder pillar made in sections, each section having an extension screwed into its adjoining section, and pins passing through the sections and extensions, substantially as set forth.

5. In a loose leaf binder of the kind described, a binder pillar made in sections, each section having an extension screwed into its adjoining section, and pins passing diagonally through the sections and extensions, substantially as set forth.

6. In a loose leaf binder of the kind described, a binder pillar, a plurality of thimbles upon the binder pillar, each thimble comprising an integrally formed flange and a sleeve, and the end of one sleeve being adapted to fit telescopically into another thimble, substantially as set forth.

7. In a loose leaf binder of the kind described, a binder pillar, a thimble having an integral flange at one end, the other end of the thimble being a sliding fit on the pillar, and adapted to fit into another similar thimble on the pillar, substantially as set forth.

8. In a loose leaf binder of the kind described, binder pillars each comprising a plurality of screw threaded sections, nuts screwed upon the pillars and having grooves, and a lock having bolts adapted to engage the grooves, substantially as set forth.

9. In a loose leaf binder of the kind described, a binder pillar having an integral flange, a binder plate having a recess on one side to receive the flange and through which the pillar passes, and a lock nut on the pillar and received by a recess formed in the other side of the plate, substantially as set forth.

In testimony whereof I have signed my name to this specification in the presence of two witnesses.

HAROLD HECTOR HENRY AHEARN.

Witnesses:
I. I. WATSON,
E. JOAN COLLEY.

Copies of this patent may be obtained for five cents each, by addressing the "Commissioner of Patents, Washington, D. C."